Dec. 13, 1966   R. C. McDOWELL   3,291,007
ANTI-FRICTION FORMER DEVICE
Filed Feb. 28, 1964   6 Sheets-Sheet 4

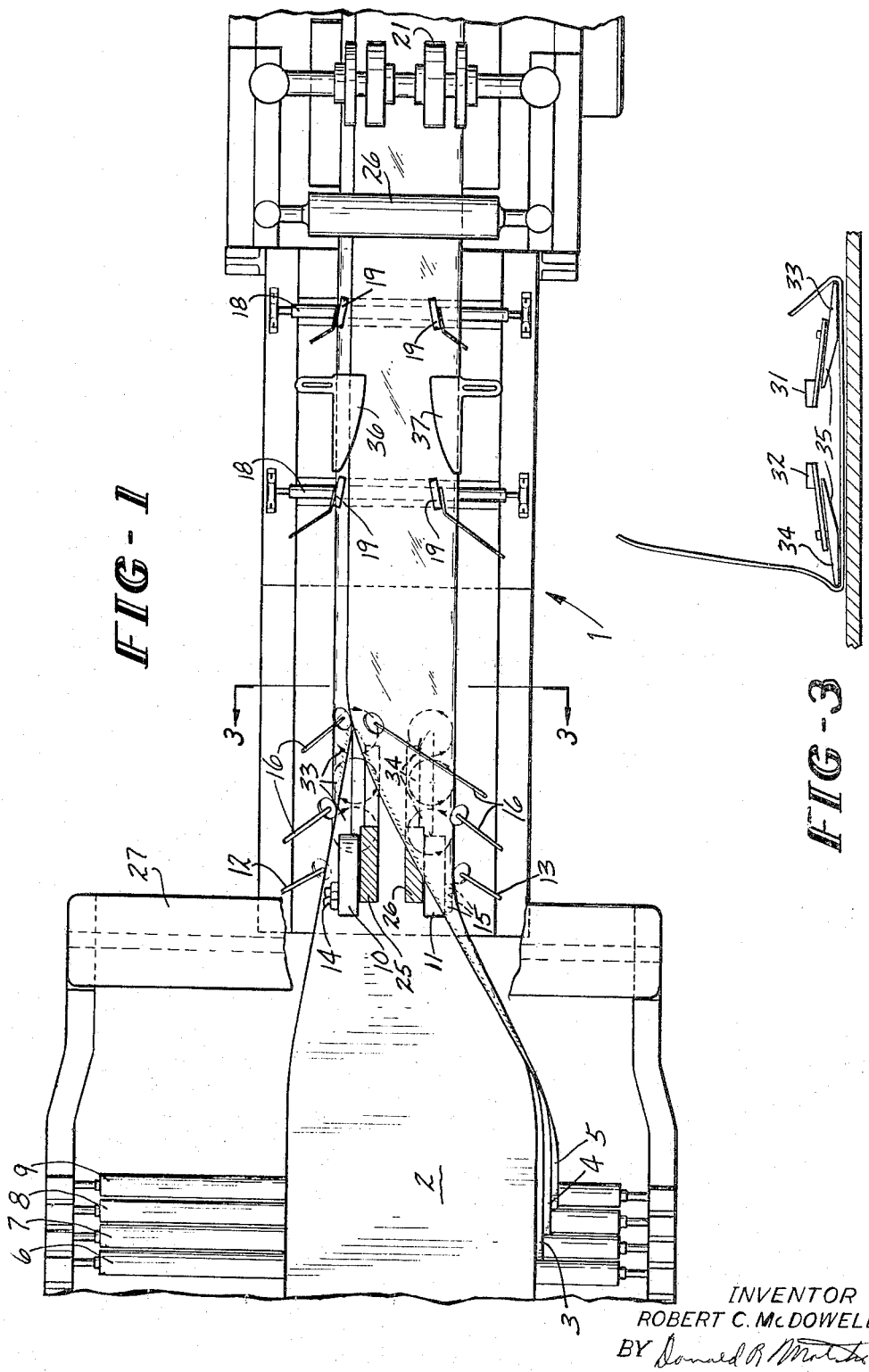

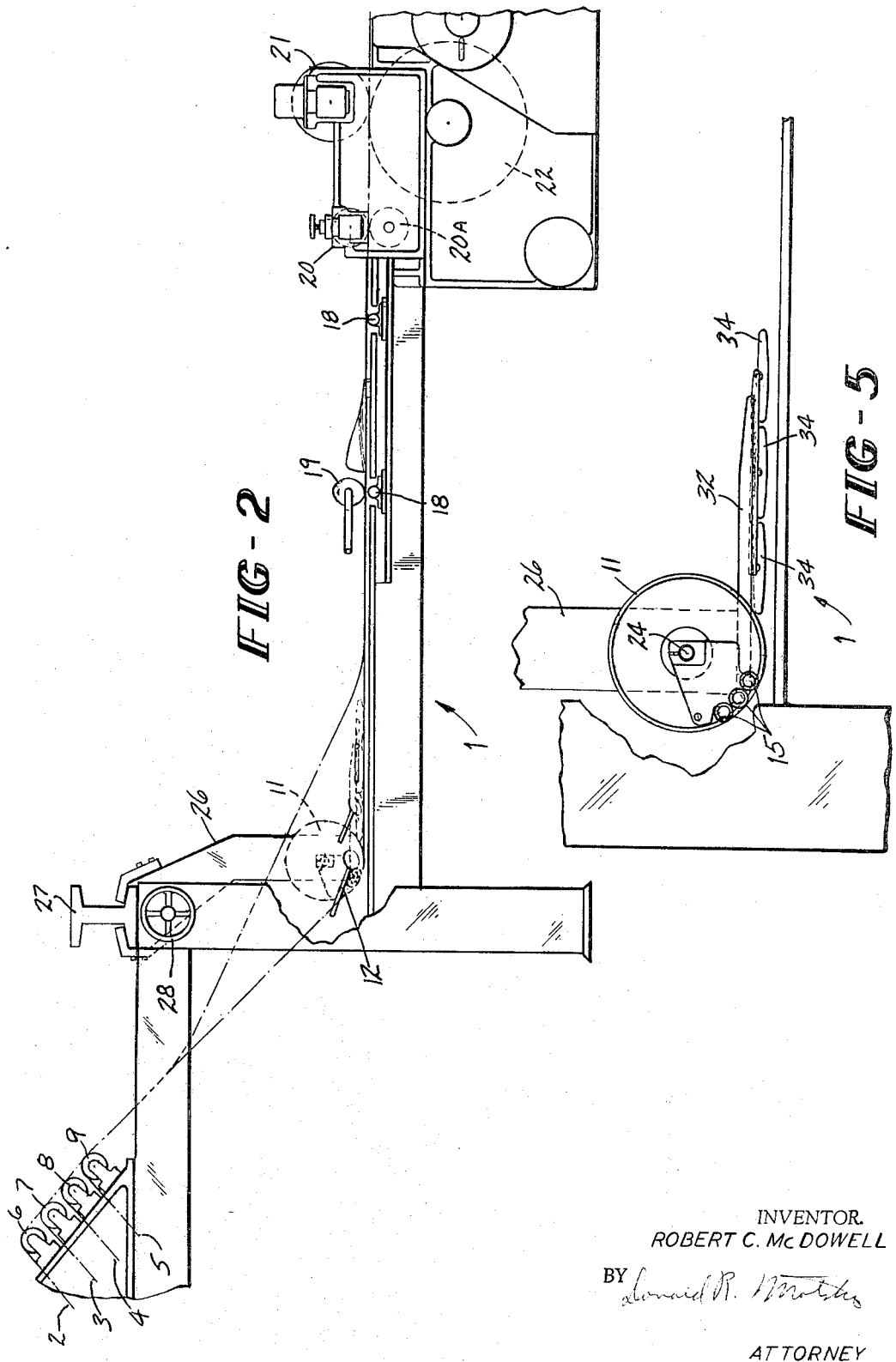

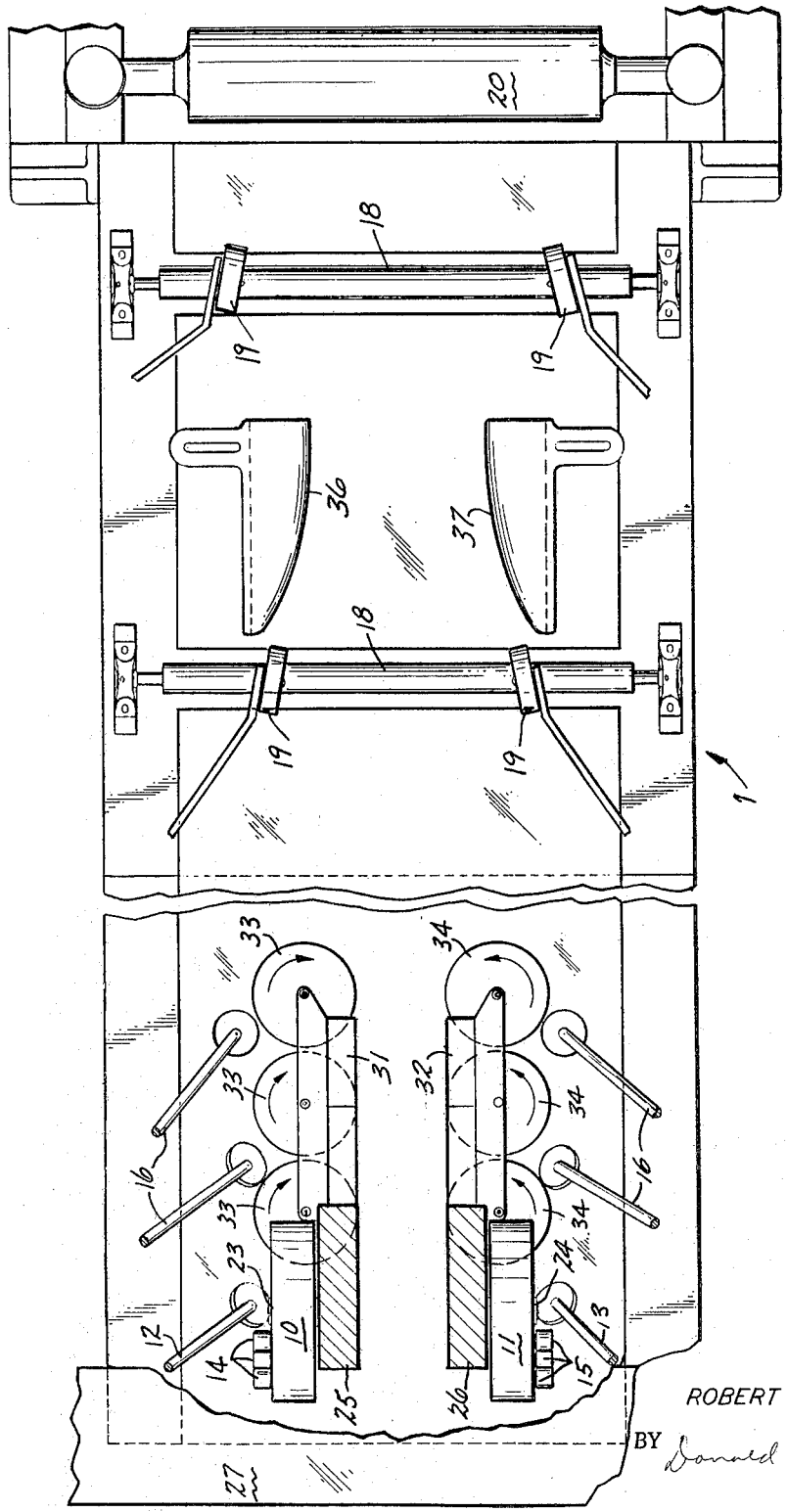

FIG-6

INVENTOR.
ROBERT C. McDOWELL
BY
*Donald R. Motsko*
ATTORNEY

Dec. 13, 1966  R. C. McDOWELL  3,291,007
ANTI-FRICTION FORMER DEVICE
Filed Feb. 28, 1964  6 Sheets-Sheet 5
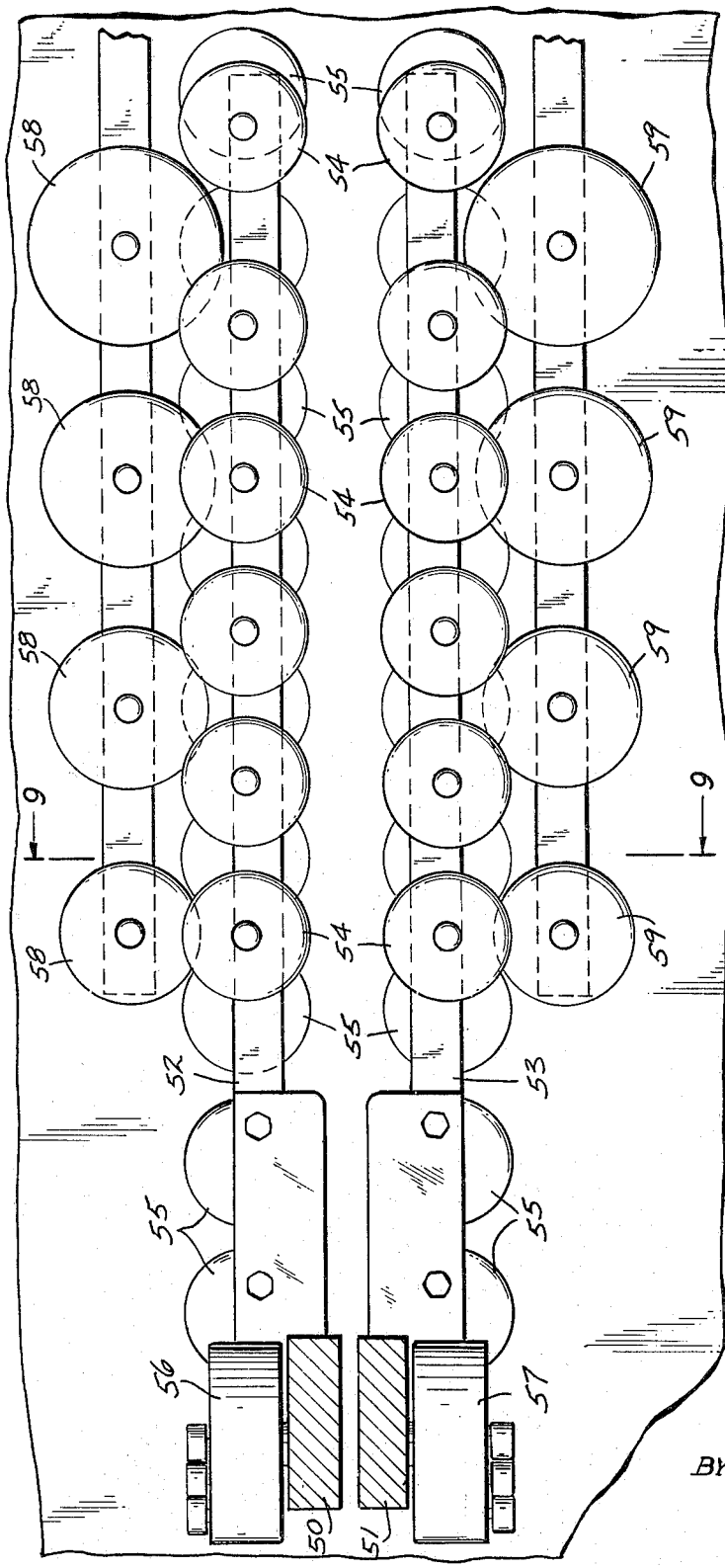
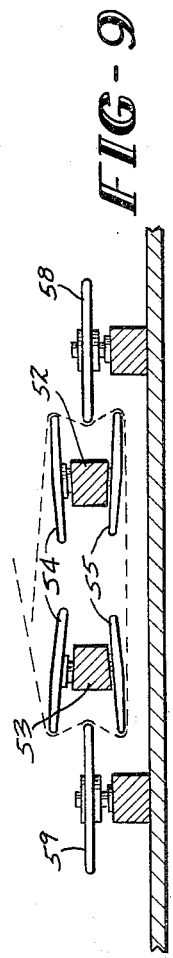
INVENTOR.
ROBERT C. McDOWELL
BY
ATTORNEY Dec. 13, 1966  R. C. McDOWELL  3,291,007
ANTI-FRICTION FORMER DEVICE
Filed Feb. 28, 1964  6 Sheets-Sheet 6
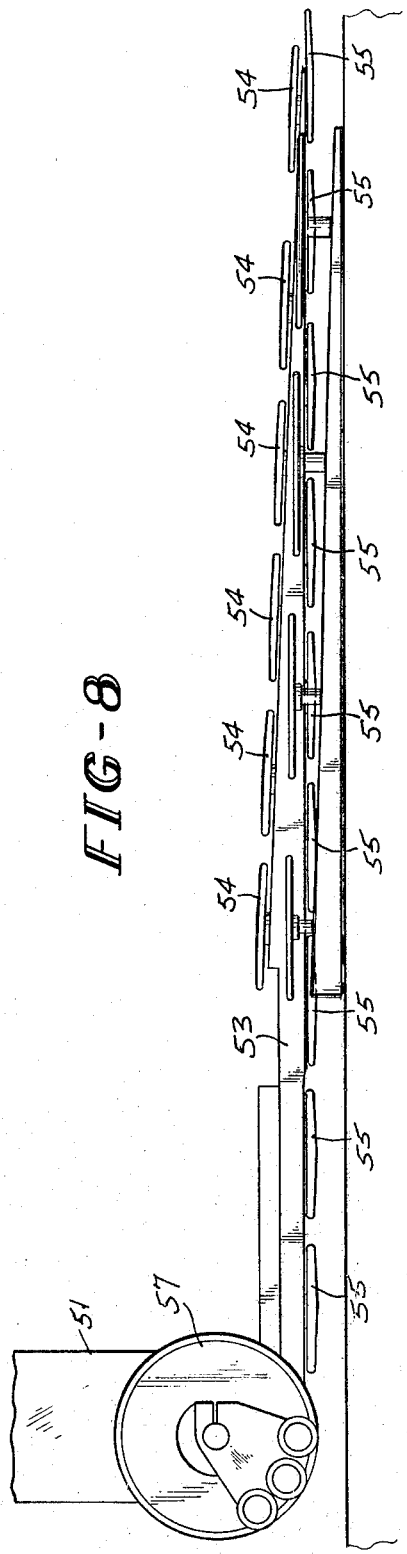
INVENTOR.
ROBERT C. McDOWELL
BY Donald R. Motiko
ATTORNEY

3,291,007
ANTI-FRICTION FORMER DEVICE
Robert Cecil McDowell, Monroe, La., assignor to Olin Mathieson Chemical Corporation, a corporation of Virginia
Filed Feb. 28, 1964, Ser. No. 348,169
6 Claims. (Cl. 93—20)

This invention relates to apparatus for forming sheet material into tubular bodies for bags of the flat or gusseted type.

This invention more specifically relates to apparatus having anti-friction surfaces for forming sheet material into tubular bodies for bags and the like to prevent scuffing and tearing of the sheet material as the tubular body is formed.

In recent years, there has been an increased demand for bags having one or more plies in which the inner ply is provided with a moisture proof polyethylene coating or in which the inner ply is comprised of free polyethylene film. When bags having an inner ply of free poly film or poly coated paper are manufactured on conventional tube formers running at regular speeds, damage due to friction or drag of the sheet on the heel and other stationary forming surfaces of the machine renders the bag unacceptable. The friction or drag causes scuffing and tearing of the poly film or coating which not only produces loose fibers and scraps in the bag which are undesirable but decreases its ability to resist moisture in the case of tears.

Attempts have been made in the past to reduce friction and drag on the sheet material as the tube is formed; however, to my knowledge, none of these schemes have been entirely successful.

It is, therefore, a prime object of this invention to provide tube forming apparatus for bags and the like which substantially eliminates friction and drag during the forming operation and thereby eliminates tearing and scuffing on the inner ply of sheet material.

It is a further object of this invention to provide an anti-friction former for making the tubular bodies of bags and the like having an inner ply of polyethylene coated paper or of free polyethylene film.

It is another object of this invention to provide apparatus for forming sheet material into tubular bodies which greatly reduces friction and drag between the inner surface of said sheet and the former structure.

It is another object of this invention to provide tube forming apparatus which can be run at conventional speeds without scuffing or tearing free films or coatings which make up the inner surface of a tubular body.

It is also an object of this invention to provide apparatus having anti-friction surfaces for forming sheet material into tubular bag bodies of the flat or the gusseted type.

These and other objects and advantages will become more readily apparent from the following detailed description and drawings in which:

FIGURE 1 is a top plan view of an anti-friction flat tube former embodying the features of my invention and shown forming plies of sheet material into tubular bodies.

FIGURE 2 is a side view of the anti-friction former shown in FIGURE 1.

FIGURE 3 is a sectional view taken along the lines 3—3 of FIGURE 1.

FIGURE 4 is an enlarged top plan view showing the tube forming section of my anti-friction flat tube former with the plies of sheet material removed.

FIGURE 5 is a partial side view of the tube forming section of my anti-friction flat former shown with the plies of sheet material removed.

FIGURE 6 is a perspective view of the tube forming section of my flat tube former.

FIGURE 7 is a plan view of an anti-friction gusseted tube former embodying the features of my invention.

FIGURE 8 is a side view of the gusseted tube former shown in FIGURE 7.

FIGURE 9 is a sectional view taken along the lines 9—9 of FIGURE 7.

Referring now to the drawings, I show a tube former which is operative to fold a plurality of flat sheets of paper stock or the like into tubular bodies for paper bags and the like. The tube former includes a base generally indicated 1. Flat sheets 2, 3, 4, and 5 are unwound from a source not shown, directed upwardly over a plurality of guide rollers 6, 7, 8, and 9 and brought together to form a plurality of plies superimposed one on the other (see FIGS. 1 and 2). The number of sheets which are fed into the tuber determine the number of plies which the tubular bag body ultimately formed will have. Sheet 2, which forms the inner ply, may be comprised of a polyethylene film or it may be a paper sheet coated with a polyethylene film or other suitable coating. After the sheets have passed through the guide rollers 6–9, they are brought together and directed downwardly and partially folded around a pair of former heel rollers 10 and 11. The folding of the paper sheets around heel rollers 10 and 11 is assisted by a plurality of tube guide rollers 12 and 13. Clearance guide rollers 14 and 15 are mounted adjacent the heel rollers to guide the paper sheets around the rims of the heel rollers as it passes the forward edge of the heel rollers. After the plies have passed the heel rollers, additional tube guide rollers 16 fold the plies around a plurality of former discs 33–34. The completely folded plies then pass over a plurality of tube support rollers 18. Mounted above the tube support rollers 18 are a plurality of skewed friction rollers 19 which are operative to establish and maintain the tube width. The folded tube then passes through a pair of smoothing rolls 20 and 20A (see FIG. 2) and through a pair of draw rolls 21 and 22 (see FIG. 2) which draw the plies through the machine. After the formed tube leaves the draw rolls, it is cut into proper lengths in a conventional manner.

The structure described above is conventional in many respects except for the following notable exceptions. In order to reduce friction on the paper sheets and eliminate scuffing and tearing on the inner ply which may be free polyethylene or polyethylene coated paper, I provide a pair of rotatable former heel rollers in place of the stationary heel plates customarily found in similar machinery. I further provide a plurality of clearance rollers mounted adjacent the rotatable heel rollers to prevent frictional engagement with the edge of the heel rollers as the sheets are partially folded about the heel rollers.

In place of the flat stationary former shoes customarily found on conventional machinery of this type, I provide a plurality of rotatable former discs about which the final folding operation is accomplished. The former discs of this invention are provided with a convex bottom surface and are mounted at an angle inclined to the horizontal to reduce frictional engagement with the paper plies to a minimum in a manner which will be apparent from the following detailed description of these elements below.

As a further departure from what is conventional in the art, I provide a plurality of ball bearings mounted rotatable support rollers to support the folded tube with minimum friction from beneath as it is drawn toward the cutting station. By utilizing the structures described above in what is otherwise a conventional tube former, I have reduced friction and drag to a minimum and made it possible to form tubular bag bodies having a free polyethylene or coated inner ply at speeds up to 500 ft./min. To my knowledge, this is not possible with known tube formers which have not been modified in accordance with this invention.

Referring to the drawings, the heel rollers 10 and 11 are rotatably mounted on a pair of axles 23 and 24 respectively (see FIGS. 4 and 6) which are fixedly mounted in vertical support members 25 and 26 respectively. The vertical support members 25 and 26 are slidably attached to a connecting girt 27 extending transversely of frame 1 as clearly seen in FIG. 6. By means of a right and left hand threaded rod 27 which is connected to supports 25 and 26, the support members can be moved toward and away from one another by merely rotating a hand wheel 28 in a conventional manner. The movement of said supports 25 and 26 allows the operator to adjust the mechanism to form tubular bodies of different width. As clearly seen in FIGS. 4 and 6, each of the heel rollers 10 and 11 is rotatably mounted on axles 23 and 24 respectively outwardly of the support members 25 and 26. A pair of inner heel rollers may also be provided inwardly of supports 25 and 26 to give added support surface if desired. Mounted outwardly of rollers 10 and 11 are a plurality of clearance guide rollers 14 and 15 respectively. The clearance guide rollers 14 and 15 are rotatably mounted on plates 29 and 30 which are fixedly secured to the axles 23 and 24 respectively. As is clearly seen in FIGS. 1 and 4, the clearance guide rollers 14 and 15 are each comprised of a plurality of rollers which function to prevent the sheets from frictionally engaging the rims of the heel rollers as the plies of sheet material are folded about the heel rollers and assist in initiating the folding of the sheets.

Secured to the bottom and extending forwardly of support members 25 and 26 in the direction of sheet travel are a pair of disc supports 31 and 32.

Rotatably secured to disc support 31 by ball bearing mounts are a plurality of former discs 33. Rotatably secured to disc support 32 are a plurality of former discs 34. As clearly seen in FIG. 3, each of the former discs 33 and 34 has a convex bottom surface 35. The discs 33–34 are mounted on disc supports 31 and 32 at an angle inclined about 5° to the horizontal so that only the outer portion of the convex bottom surfaces 35 engages the inner ply of sheet material as clearly seen in FIG. 3. As can be seen in FIG. 4, discs 33 are rotating in a clockwise direction as indicated by the arrows whereas discs 34 are rotating in a counterclockwise direction as they are engaged by the traveling sheet material. Only the outer portions of the convex bottom surfaces are traveling in the same direction as the paper sheet whereas the inner portions of the convex bottom surfaces are traveling in a direction opposite to the direction of travel of the paper. By mounting the former discs 33 and 34 in the manner disclosed above and providing the convex bottom surface, frictional engagement with the inner ply of sheet material is reduced to the minimum and scuffing is avoided by eliminating contact of the inner ply with that portion of the disc surface which is traveling in a direction opposite to the direction of travel of the sheet material. This arrangement further provides for surface contact of the former discs with the sheet material (as clearly seen in FIG. 3) as opposed to only edge contact, as would be the case if the former discs were entirely flat on the top and bottom surfaces.

Tube guide rollers 16 assist in folding the plies of sheet material around the former discs. Obviously as many tube guide rollers 16 are provided as necessary to perform the desired function. The tube guide rollers are adjustably mounted as seen in FIG. 6 and can be adjusted to any desired position.

As the plies leave the former discs, a complete tube has been formed. The completed tube is drawn toward the opposite end of the machine by the draw rolls 21 and 22 shown in FIG. 2. In its travel toward the draw rolls, the formed tube is supported by a plurality of ball bearing mounted rotatable tube support rollers 18. A plurality of skew rollers 19 are positioned immediately above support rollers 18 and are skewed inwardly. The skew rollers function to establish and maintain the tube width as the tube is drawn toward the opposite end of the machine and the tube support rollers prevent undue drag from beneath the tube. Mounted between the tube support rollers 18 are a pair of tube guide shoes 36 and 37 (see FIG. 4) which also function to assist in maintaining the tube width and guiding the tube. The folded and formed tube then passes between a pair of smoothing rolls 20 and 20A (FIG. 2) which smooth and crease the tube and then between a pair of draw rolls 21 and 22 (FIG. 2). The formed tube is then cut into lengths in a conventional manner by means not shown.

It is readily apparent from the detailed description above that the tube former made according to this invention reduces friction and drag on the sheet material to a minimum as the plies of sheet material are formed into a tubular body. Scuffing and tearing in the inner ply is completely eliminated and the tube can be formed at conventional speeds.

Referring now to FIGS. 7–9, I show a modified embodiment of an anti-friction former which is operative to form tubular bodies of the gusseted type.

The gusseted tube former shown in FIGS. 7–9 differs substantially from the flat tube former described above only in the arrangement, and disposition of the former discs and by the addition of tucking discs, all of which are described in detail below. It may be assumed that all other features of the gusseted tuber are similar or identical to the flat tuber described above.

Referring now to FIG. 7 of the drawings, a pair of vertical support members 50 and 51 are shown in section. The vertical support members 50 and 51 are mounted and function in the same manner as vertical support members 25 and 26 described above in connection with the flat former. Connected to the vertical support members 50 and 51 and extending forwardly therefrom are a pair of disc support members 52 and 53. Note in FIG. 8 that disc support members 52 and 53 are tapered toward the delivery end of the former so that the spacing between the upper and lower surfaces of the support members is decreasing.

A plurality of former discs are rotatably secured to the upper and lower surfaces of support members 52 and 53. The upper former discs 54 are mounted in staggered relation with respect to the lower former discs 55. Note also that there are a greater number of the lower discs 55 and that they extend farther back toward heel rollers 56 and 57. Since the plies of sheet material which are to be formed into a tube will engage the lower discs at a point closer to the heel rollers, more of the lower discs are normally required. It should be noted here also that the function of heel rollers 56 and 57 is identical to heel roller 10 and 11 described above in connection with the flat former.

The upper former discs 54 are each provided with a convex upper surface and are mounted at an angle inclined inwardly relative to the horizontal so that only the outer portion of the upper surface of each upper disc engages the sheet material as clearly seen in FIG. 9. Likewise, each lower former disc 55 is provided with a convex lower surface and is rotatably mounted on the disc support member at an angle inclined inwardly relative to the horizontal so that only the outer portion of the lower convex surface engages the sheet material as seen in FIG. 9. Since only the outer portions of the former discs are rotating in the direction that the sheet material is traveling, this arrangement greatly reduces friction and scuffing on the inner ply of sheet material. The tapered forward portion of the disc support members 52 and 53 causes the spacing between the upper and lower discs 54 and 55 to decrease toward the free end of the disc support members. This arrangement allows the sheet material to be formed around the former discs, gusseted and then flattened as the tube leaves the discs.

A plurality of tucking discs 58 and 59 are mounted on each side of the disc support members 52 and 53 respectively. The tucking discs are freely rotatable and arranged so that a portion of each tucking disc engages between the upper and lower former discs mounted on the respective disc support members 52 and 53. In the arrangement illustrated, the tucking discs are increased in diameter toward the delivery end of the tube former so that the tucking edge of the tucking discs progressively extend farther in toward the disc support members. Since the disc support members taper in the same direction, the sheet material is tucked in farther as the distance between the upper and lower former discs decreases. By this arrangement, gussets are smoothly and uniformly formed as the sheet material is folded into a tube about the former discs 54 and 55 as is clearly seen in FIG. 9. Note that in FIG. 9, sheet material is shown in phantom lines as it is formed into a gusseted tube.

The formed gusseted tube is then drawn toward the delivery end of the machine in the same manner as described above with respect to the flat former.

While this invention has been described in detail with respect to certain preferred embodiments, it is anticipated that various modifications and design variations are apparent which are within the spirit and scope of the appended claims.

I claim:

1. A multi-wall tube former for simultaneously folding at least two plies of flat, flexible, coextensive sheet material into tubular bodies including a support frame, a plurality of heel rollers rotatably mounted adjacent one end of said frame, clearance guide rollers mounted adjacent said heel rollers to prevent frictional engagement of sheet material with the outer rims of said heel rollers, a plurality of former discs positioned downstream of said heel rollers, each of said former discs having a convex working surface, and means mounting said former discs at an angle inclined to the horizontal so that only the outer portion of the convex surface of each of said discs contacts said sheet material as the sheet material is folded into a tubular body about said former discs.

2. An anti-friction former for forming at least two flexible, coextensive flat sheets of material into tubular bodies, said former including tube forming means at one end and draw means at the other end, said tube forming means including a pair of heel rollers rotatably mounted at one end of a pair of vertical support members, a plurality of clearance guide rollers mounted upon and individual to each heel roller to keep portions of said sheets free of said heel rollers, a plurality of former discs rotatably mounted on a pair of disc supports, said disc supports comprising a pair of cantilever arms connected at one end to said vertical support members and having a free end extending toward said draw means, each of said former discs including a convex surface, and means rotatably mounting said former discs on said disc supports so that only the outer portion of the convex surface of each former disc contacts said sheet material.

3. A multi-wall tube former for continuously advancing and folding, simultaneously, at least two coextensive plies of flexible, flat sheet material into an endless tube while generating a minimum of friction, the innermost ply of said tube being a plastic film or a composite of plastic film and kraft paper; said tube former comprising a support frame, a plurality of relatively movable heel rollers rotatably mounted on one end of said frame, clearance guide rollers mounted upon and individual to each heel roller to prevent engagement of said plies with edge portions of said heel rollers, a plurality of rotatable former discs mounted individually on said frame each on an inclined axis and positioned downstream of said heel rollers, each of said former discs having a convex surface, said convex surface and said inclined axis cooperating to provide on each disc a working surface moving in the same direction as the advancing plies, means for folding said plies so that they tend to encircle the former discs effective to generate an endless tube having a predetermined width, a plurality of support rollers with complementary and cooperating skew rollers mounted on the frame and positioned downstream of said former discs, said support rollers and skew rollers being operative to maintain the tube width established by said former discs, a pair of smoothing rolls downstream of said support rollers for creasing and flattening the tube and draw rolls downstream of said smoothing rolls for continuously advancing said plies.

4. A multi-wall tube former as defined in claim 3 wherein the former discs are mounted in layers or spaced tiers, the rotational axis of each disc being canted so that only a portion of the convex surface of each disc makes areal contact with the continuously advancing sheet material, each tier of former discs cooperating with a layer of rotatable tucking discs mounted on said support frame adjacent said former discs, said tucking discs making edge or peripheral contact with one of said plies.

5. A multi-wall tube former for continuously advancing and folding, simultaneously, at least two generally coextensive plies of flexible, flat sheet material into an endless tube while generating a minimum of friction, the innermost ply of said tube being a plastic film or a composite of plastic film and kraft paper; said tube former comprising a support frame, a plurality of relatively movable heel rollers rotatably mounted on one end of said frame, a plurality of rotatable former discs mounted individually on said frame each on an inclined axis and positioned downstream of said heel rollers, each of said former discs having a convex working surface, said convex surface and said inclined axis cooperating to provide on each disc a working surface moving in the same direction as the advancing plies, means for folding said plies so that they tend to encircle the former discs effective to generate an endless tube having a predetermined width, a plurality of support rollers with complementary and cooperating skew rollers mounted on the frame and positioned downstream of said former discs, said support rollers and skew rollers being operative to maintain the tube width established by said former discs, a pair of smoothing rolls downstream of said support rollers for creasing and flattening the tube and draw rolls downstream of said smoothing rolls for continuously advancing said plies.

6. A multi-wall tube former for advancing and simultaneously folding at least two coextensive plies of flat sheet material into tubular bodies, an internal ply of said material tending to resist advance and being susceptible of scuffing and marring, said tube former comprising a support frame, a plurality of relatively movable heel rollers rotatably mounted on one end of said frame, clearance guide rollers mounted upon and individual to each heel roller to keep portions of said internal ply free of said heel rollers, a plurality of former discs mounted on said support frame and positioned downstream of said heel rollers, each of said former discs having a convex working surface, means for folding said plies in unison so that they tend to encircle the former discs effective to generate a tube having a predetermined width, a plurality of support rollers with complementary and cooperating skew rollers mounted on the support frame and positioned downstream of said former discs, a pair of tube guide shoes positioned between said support rollers, said support rollers, skew rollers and guide shoes being operative to maintain the tube width established by said former discs, a pair of smoothing rolls downstream of said support rollers for creasing and flattening the tube and draw rolls downstream of said smoothing rolls for continuously advancing said plies.

References Cited by the Examiner

UNITED STATES PATENTS

| | | |
|---|---|---|
| 2,660,219 | 11/1953 | Haas et al. |
| 2,701,989 | 2/1955 | Hayward et al. _____ 93—20 |
| 2,818,004 | 12/1957 | Taylor _____ 93—20 |
| 2,995,361 | 8/1961 | Lopez. |
| 3,104,596 | 9/1963 | Bergstein et al. _____ 93—20 X |
| 3,185,044 | 5/1965 | Ahlbrandt _____ 93—20 |

FOREIGN PATENTS 780,468  7/1957  Great Britain.

BERNARD STICKNEY, *Primary Examiner.*